Sept. 23, 1924.
A. W. WAHLIN ET AL
SHOCK ABSORBER
Filed Oct. 24, 1921    2 Sheets-Sheet 1
1,509,274
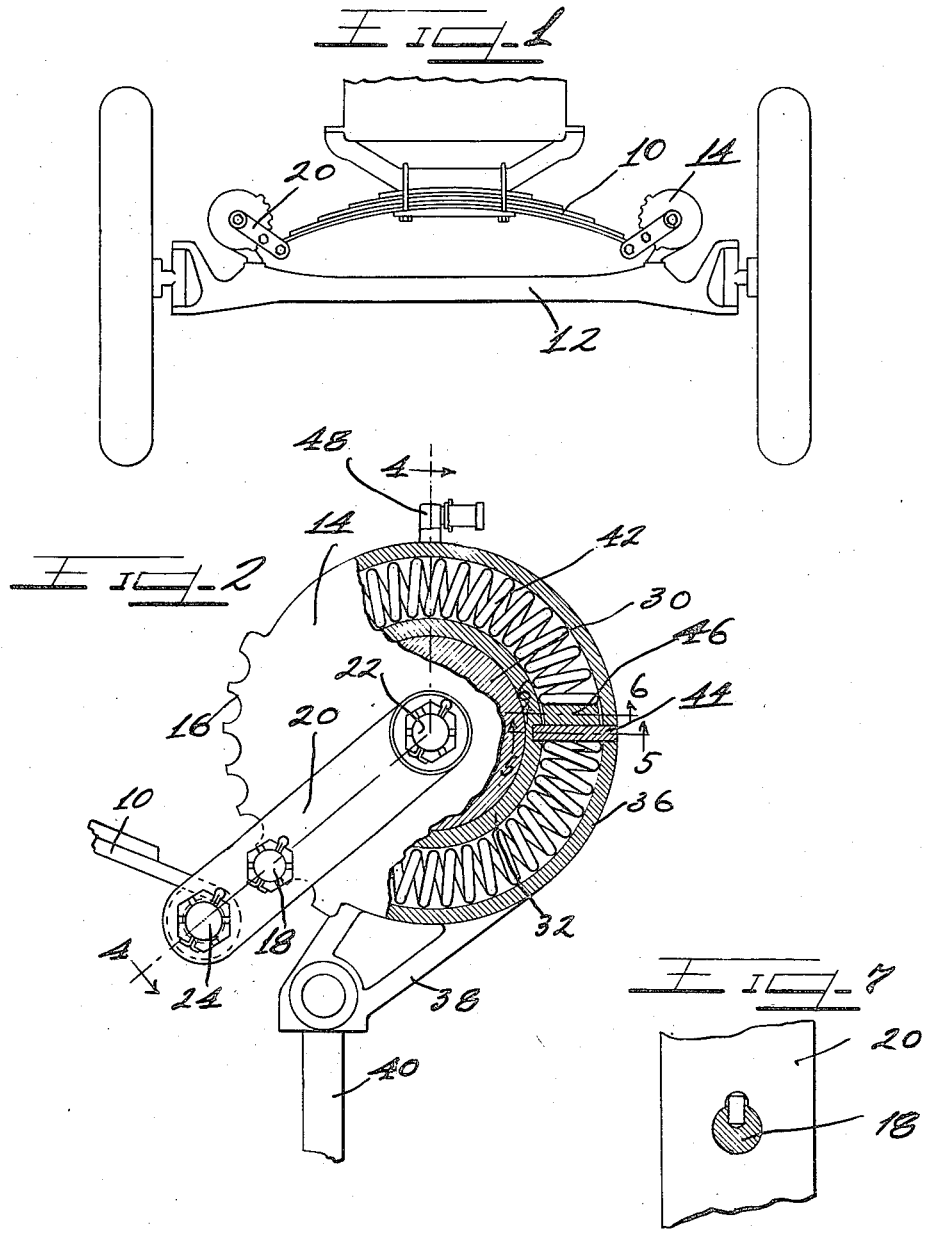
Witnesses
Inventors
AXEL W. WAHLIN
CARL B. ERICKSON Sept. 23, 1924. 1,509,274
A. W. WAHLIN ET AL
SHOCK ABSORBER
Filed Oct. 24, 1921 2 Sheets-Sheet 2
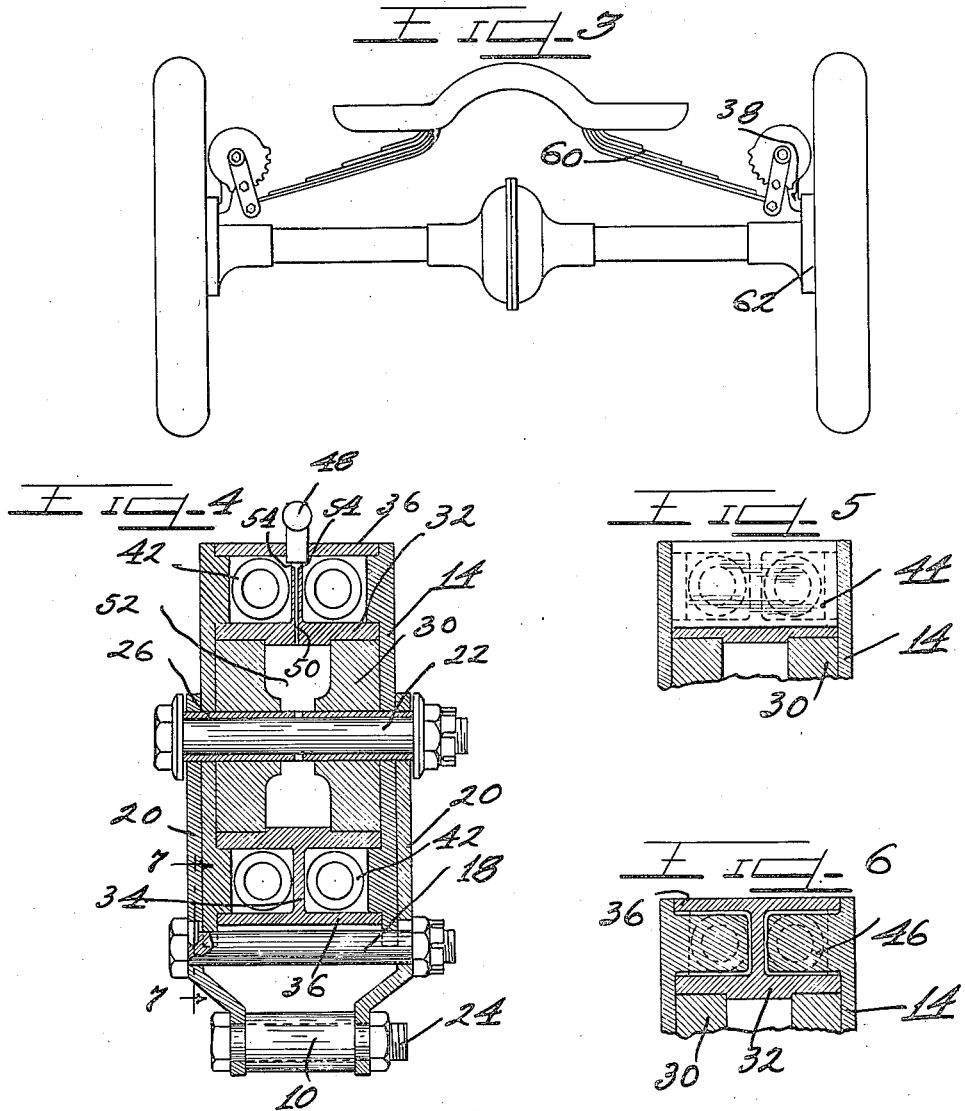

Patented Sept. 23, 1924.

1,509,274

UNITED STATES PATENT OFFICE.

AXEL W. WAHLIN AND CARL B. ERICKSON, OF CHICAGO, ILLINOIS.

SHOCK ABSORBER.

Application filed October 24, 1921. Serial No. 509,882.

*To all whom it may concern:*

Be it known that we, AXEL W. WAHLIN and CARL B. ERICKSON, citizens of the United States, and residents of the city of Chicago, in the county of Cook and State of Illinois, have invented certain new and useful Improvements in a Shock Absorber; and we do hereby declare that the following is a full, clear, and exact description of the same, reference being had to the accompanying drawings and to the numerals of reference marked thereon, which form a part of this specification.

This invention relates to improvements in shock absorbers for automobiles or the like and has for its principal object the provision of such a shock absorber which may be readily applied and which will act both as a shock absorber and as a rebound check, the apparatus being formed as a detachable unit.

One of the objects of this invention is the provision of a shock absorber adapted to be used with small cars, especially automobiles of the Ford type, which will act to efficiently absorb the moderate shocks due to the vehicle passing over small objects or inequalities in the road which ordinarily do not affect the main springs but which cause considerable annoyance to the occupants of the car on account of the incessant chattering motion.

Another object of this invention is the provision of a shock absorber which is adapted to be secured between the end of a vehicle spring and the axle or chassis, and which will act to efficiently prevent rebound of the spring and which will also fully absorb any minor shocks.

A further important object of this invention is the provision of a shock absorber of the spring type wherein a coiled helical spring is provided enclosed in a housing in such a manner that it will act in two directions to both absorb shocks and prevent rebound, and which is so enclosed that the friction of the sides of the spring against the inner face of the housing acts in a considerable degree to aid the shock absorbing properties, and also to function as a recoil snubber.

A still further important object of the invention is the provision of a shock absorber embodying a coiled spring enclosed in a housing, which housing is adapted to be filled with grease or the like, whereby the action of the coiled spring in the housing will be considerably retarded and afford a much stiffer action of the shock absorber whenever desired.

Still another important object of this invention is the provision of a unitary spring acting shock absorber having adjusting means provided thereon whereby the tension of the shock absorbing spring may be varied as desired.

Other and further important objects of this invention will be apparent from the disclosures in the accompanying drawings and the following specification.

The invention (in a preferred form) is illustrated in the drawings and hereinafter more fully described.

On the drawings:

Figure 1 is a view of the front axle and spring of a Ford automobile with the improved device of this invention shown as applied thereto.

Figure 2 is a side elevation with parts broken away showing the shock absorber as a unit.

Figure 3 is a view of the shock absorber as applied to the rear axle of an automobile.

Figure 4 is a sectional view taken on the line 4—4 of Figure 2.

Figure 5 is a section taken on the line 5—5 of Figure 2, looking in the direction indicated by the arrow.

Figure 6 is a section taken on the line 6—6 of Figure 2, looking in the direction indicated.

Figure 7 is a section on the line 7—7 of Figure 4.

As shown on the drawings:

The reference numeral 10 indicates the front spring of an automobile preferably shown in this invention as of the Ford type, wherein it is parallel to the axle 12 of the automobile; but it is obvious that the position of the spring may be at right angles to the axle without changing the construction of the shock absorber and that the same may be applied to any spring now on the market. The shock absorber comprises a case including two outer circular cover plates 14 as shown. In the outer edge of each plate is formed a series of integral notches 16 with which a transversely extending bolt 18 is adapted to cooperate. The bolt 18 connects two pivoted arms 20 mounted upon a central shaft 22 of the device and having their free ends adapted to cooperate with the bolts or shackles 24 in the ends of the spring 10.

As best shown in Figure 4, the arms 20 are pivotally mounted on the shaft 22 by means of a bearing sleeve 26 and upon the bearing sleeve 26 is likewise mounted the two end plates 14 which comprise the cover of the device. The arms 20 and the plates 14 are adapted to turn about the shaft or bolt 22 as an integral member, this being accomplished by the connection of the same by means of the bolt 18 which extends through suitable openings in the arms 20 and cooperates with one of the notches 16 in the plates 14. Likewise mounted on the bearing shaft 22 and sleeve 26 is a bearing member or arbor 30 positioned between the plates 14 and adapted to allow rotation of the same without undue friction. A cylindrical sleeve 32 is rotatably positioned about this arbor 30 and is preferably formed in the shape of a cylindrical I-beam, as best shown in Figure 4, having a web 34 and an outer plate 36 integral therewith. A downwardly extending lug 38 is securely attached to or formed integral with the I-beam member 32—34—36 and is adapted to be fitted into the axle of the machine by means of a bolt or the like 40.

In the spaces formed between the inner and outer plates 32 and 36 the web member 34, and the outer plates 14 of the device, are positioned helical springs 42 coiled as shown in the figures. One end of each of these springs abuts against a stop member or plate 44 fixed in the cylindrical member 32—34—36 and which can be made integral therewith if desired. Adjacent this stop plate in the normal operation of the device is a lug or pair of lugs 46, as best shown in Figures 2 and 6, which are integral with the outer plates 14 and adapted to move therewith and thereby vary the tension of the coiled springs 42. It will be observed from Fig. 6 that the lugs 46 do not occupy the whole of the cross section of the space between the walls 32 and 36 and the web 34. A small gap surrounds each of these lugs on three sides. The plates 14 on the other hand fit closely against the edges of the walls.

A grease cup 48 is provided at any convenient portion of the device adapted to lubricate the interior thereof and connects with a passage 50 communicating with an open space 52 in the arbor 30 whereby grease or other lubricant may be forced into said space. Auxiliary openings 54 are also provided whereby a sufficient or necessary quantity of lubricant may be forced into the channels or annular chambers which contain the coiled springs 42.

As shown in Figure 3, the device may be equally well attached to the rear spring 60 of an automobile and the attachment of the downwardly extending arm 38 may be made direct to the brake drum 62 of the chassis, as is usual in the construction of these automobiles.

The operation is as follows:

A preliminary adjustment of the position of the arm 20 with respect to the inner spring containing member is accomplished when the device is positioned upon the chassis of the automobile. If a quite large initial tension is desired the bolt or stop member 18 is positioned higher in the series of notches 16 than as is shown in the drawings. This will result in moving the stop member 46 to a higher position than is shown in Figure 2 owing to the anti-clockwise movement of the outer plates 14, thereby accomplishing an additional initial tensioning of the coiled springs 42. The ends of the coiled springs, which are adjacent the integral lug 44, are held in position as this lug being integral with or brazed to the inner member 32—34—36 is immovably fixed on the machine by means of the arm 38 and bolt 40. Any additional weight placed in the body of the machine will bring the end of the spring downwardly and outwardly, and tend to compress the coiled springs 42, thereby exerting a supplementary tension on said springs, which being more flexible than the main springs 10 or 60 will act to absorb any small shocks which are ordinarily transmitted to the main spring. Any tendency to rebound will also be effectively checked on account of the friction between the various members of the device and also between the coiled springs 42 and the sides of their enclosing recesses.

It will be seen that this device is absolutely free from any objectionable noise and rattling which are ordinarily present in shock absorbers adapted to be applied as auxiliaries to the regular equipment of automobile springs. This results from the minimum number of parts employed in the construction of this device and the extraordinary compactness of same which results in a very smooth action and one which is entirely free from the objectionable chattering, ordinarily always present in devices of this character. It will further be noted that the resistance to rebound of the device may be effectively increased by packing the interior thereof with grease or similar lubricants, whereby the action of the coiled springs 42 and of the inwardly extending lugs 46 is retarded to quite a considerable degree. When stiff grease is used it adds materially to the shock-absorbing action of the device, because motion of the lugs 46 along the passages between the walls 32 and 36 is checked by the fact that it must be accompanied by a flow of the grease through the gaps illustrated in Fig. 6. Even when the pressure of the lugs 46 against the grease is considerable, no grease emerges between the wall 36 and the plates 14 because these parts fit tightly to afford the needed friction.

Moreover, this device may readily be applied and without the use of any extra parts or tools, and it also eliminates the necessity of drilling holes or the like in the ordinary equipment when the same is to be attached.

We are aware that many changes may be made and numerous details of construction varied throughout a wide range without departing from the principles of this invention, and we therefore do not purpose limiting the patent granted hereon, otherwise than necessitated by the prior art.

We claim as our invention:

1. A shock absorber for automobiles including in combination, a case comprising two substantially circular plates, a bearing member therebetween adapted to be fixed to the axle of the automobile, a central pin on which the plates are adapted to rotate, arms mounted on the pin at one end, said arms having their other ends adapted to be attached to the spring of the automobile, resilient means interposed between the fixed bearing member and the rotatable case to retard relative movement therebetween, and adjustable means between the arms and the circular plates whereby their relative positions may be changed to vary the tension in said resilient means.

2. A shock absorber including in combination, a cover comprising a pair of plates, spring supporting arms adjustably mounted on the plates, a fixed bearing member adapted to operate between said plates, and resilient members coacting with the plates and the bearing members to retard free movement therebetween.

3. In an automobile shock absorber, a fixed member, chambers formed in said member, helical coiled springs located in said chambers, a pair of plates adapted to cooperate with the front and rear faces respectively of said fixed member and provided with means bearing on one end of the helical springs, a lubricating chamber in the fixed member, and means for distributing lubricants to the chambers in the fixed member.

4. In combination with the springs and axle of an automobile, a shock absorbing device having a movable arm adapted to be connected to the end of the springs, a bearing member for said arm adapted to be rigidly connected to the axle, resilient means between said movable arms and said bearing members, a chamber in said bearing member for said resilient means, and means for injecting a motion retarding medium into said chamber.

5. In a shock absorber, a fixed bearing member, a shaft rotatably mounted in said bearing member, plates mounted on said shaft and adapted to rotatably coact with the inner and outer faces of said bearing member, links having one end pivotally mounted upon the shaft and with their other end adapted to be attached to the end of the spring of the automobile, and means on said links for adjustably positioning them with respect to the facing plates.

6. In a shock absorber, a fixed bearing member, a shaft rotatably mounted in said bearing member, plates mounted on said shaft and adapted to rotatably coact with the inner and outer faces of said bearing member, links having one end pivotally mounted upon the shaft and with their other end adapted to be attached to the end of the spring of the automobile, means on said links for adjustably positioning them with respect to the facing plates, and resilient means between said fixed bearing member and the rotatable plates.

7. In a shock absorbing device, a member having an annular passage, a member mounted for rotation concentric with said passage, said passage having a resistant medium therein, a projection from said rotatably mounted member into said passage, said projection incompletely occupying the cross section of said passage whereby said medium can flow from one side of said projection to the other within the passage, means connecting one of said members to a vehicle, means connecting the other of said members to the axle, said connecting means acting to produce motion of said projection along said passage upon motion of the vehicle relative to the axle and resilient means within said passage for returning said projection.

In testimony whereof we have hereunto subscribed our names in the presence of two subscribing witnesses.

AXEL W. WAHLIN.
CARL B. ERICKSON.

Witnesses:
JAMES M. O'BRIEN,
C. LINDQUIST.